United States Patent
Cabuz (10) Patent No.: US 6,750,589 B2
(45) Date of Patent: Jun. 15, 2004

(54) METHOD AND CIRCUIT FOR THE CONTROL OF LARGE ARRAYS OF ELECTROSTATIC ACTUATORS

(75) Inventor: Eugen I. Cabuz, Edina, MN (US)

(73) Assignee: Honeywell International Inc., Morristown, NJ (US)

( * ) Notice: Subject to any disclaimer, the term of this patent is extended or adjusted under 35 U.S.C. 154(b) by 235 days.

(21) Appl. No.: 10/057,073

(22) Filed: Jan. 24, 2002

(65) Prior Publication Data

US 2003/0137215 A1 Jul. 24, 2003

(51) Int. Cl.$^7$ .................................................. H02N 1/00
(52) U.S. Cl. ...................................... 310/309; 318/116
(58) Field of Search ......................... 310/309; 318/116; 359/223–225, 289–291; 385/13, 16, 18

(56) References Cited

U.S. PATENT DOCUMENTS

| | | | |
|---|---|---|---|
| 1,123,275 A | 1/1915 | Gugler et al. ................. 320/121 |
| 3,619,647 A | 11/1971 | Garkow ....................... 307/227 |
| 5,321,404 A | 6/1994 | Mallinson et al. ........... 341/169 |
| 5,483,434 A | 1/1996 | Seesink ......................... 363/60 |
| 5,744,936 A | 4/1998 | Kawakami ................... 320/120 |
| 5,914,553 A | 6/1999 | Adams et al. ............... 310/309 |
| 5,945,870 A | 8/1999 | Chu et al. .................... 327/536 |
| 6,157,243 A | 12/2000 | Tailliet ........................ 327/536 |
| 6,396,976 B1 * | 3/2002 | Little et al. ................... 385/18 |
| 2002/0106144 A1 | 8/2002 | Garverick et al. ............. 385/18 |
| 2002/0122237 A1 * | 9/2002 | Sandstrom et al. .......... 359/291 |

FOREIGN PATENT DOCUMENTS

| | | | |
|---|---|---|---|
| EP | 0 629 503 A2 | 12/1994 | ............ B41J/2/045 |
| EP | 0 624 272 A2 | 1/1995 | ............ B41J/2/045 |
| JP | 2001-339962 | * 12/2001 | ............ H02N/1/00 |

OTHER PUBLICATIONS

International search report, PCT/US03/03023, Aug. 2003.*

* cited by examiner

Primary Examiner—Karl Tamai (57) ABSTRACT

A circuit and method for controlling an array of n electrostatic actuators, where n is an integer, preferably of at least 32 and may be in excess of 10,000 or more. At least one high voltage generator is provided having a desired high voltage output. N switches are operably connected to the generator, each switch being directly connected to one of the n electrostatic actuators. N capacitors, one of which is connected in parallel to each of the n actuators receives voltage from the high voltage generator through its specific switch. A central processor controls the desired voltage in a particular wave form and the time each of the n switches is closed. The shape of the voltage and the time of the voltage rise is determined by the voltage leakage in the components of the array.

25 Claims, 6 Drawing Sheets

METHOD AND CIRCUIT FOR THE CONTROL OF LARGE ARRAYS OF ELECTROSTATIC ACTUATORS

FIELD OF THE INVENTION

The present invention relates to large arrays of electrostatic actuators that need large actuation voltages. More particularly the invention relates to a method and apparatus for controlling large arrays of over one thousand electrostatic actuators using actuation voltages of hundreds of volts, while providing fine control of the voltage of each actuator at minimum power and size.

BACKGROUND OF THE INVENTION

With increasing MEMS devices being accepted in the market place, the diversity of required drive/sense electronic circuits has increased. One of the most challenging aspects of this product development is the need for fine control of the voltage of each actuator (out of a thousand or more) while using minimum power. At the present time, such a method and apparatus does not exist in the commercial market.

Gugler et al. U.S. Pat. No. 1,123,275 broadly disclosed the general concept of a combination of a voltage source, a regulating switch, and multiple loads. This reference teaches the need for having power being transmitted to multiple loads, but, of course, does not recognize the needs of electrostatic actuators of any size.

The use of a plurality of voltage ramps is disclosed in Mallinson et al. U.S. Pat. No. 5,321,404, for use with an analog to digital converter. It does not contemplate large numbers of voltage outputs through switches. Chu et al. U.S. Pat. No. 5,945,870 discloses high voltage generator circuits with well controlled ramp rates, particularly for use in electrically erasable programmable read only memories. It does not suggest charging and refreshing capacitors simultaneously at the voltage needed for the allocated actuators.

Also, Tailliet U.S. Pat. No. 6,157,243 discloses the generation of charges in a charge pump device with saw tooth shaped clock signals. Though the concept of generating a large voltage (in this case ten to twenty volts) is disclosed, the simultaneous use of that voltage, or voltages larger by a factor of ten, is not considered. Staircase high voltage is disclosed in Barkow U.S. Pat. No. 3,619,647. Seesink U.S. Pat. No. 5,483,434 teaches a series of diode and capacitor combinations are connected such that voltage is multiplied to produce a high voltage output at the last capacitor.

As can be seen, none of the prior art suggests large array electrostatic actuator control, and more particularly, none of the art suggests a system in which voltage drift can be compensated for when the electrostatic actuator, capacitor and electronics experiences leakage.

The use of very large arrays of electrostatic actuators is not a well developed field yet because it has been difficult to control all of the arrays in a period of time short enough to accomplish the objectives of the device using the arrays. For example, a large array may be usable in a polychromatic device where 1024 beams are provided, each with an electrostatic actuator and each with a mirror, such that pure white light can be reflected from the mirrors to generate a particular spectrum pattern. By comparing known spectra to observed spectra, the user could identify which particular material, such as a gas remote from the observer, is being deployed. Another potential for large arrays, in the 1000s, would be large antennae that might be launched into space folded like an umbrella for launch, then expanded and positioned when in orbit. With proper control of the electrostatic actuators, an antenna of diameter of one hundred meters or more could be deployed. Proper control of this multiplicity of actuators would be necessary for these such devices to properly function as intended.

It would be of great advantage in the art if a method and apparatus for controlling large arrays of electrostatic actuators could be provided.

It would be another advance in the art if the method and apparatus would include the use of a large number of capacitors, one for each electrostatic actuator of an array, such that the capacitors would be charged simultaneously at the voltage needed for the allocated actuator.

Yet another advance would be to have a method and apparatus for responding to the voltage leaks that actuators and capacitors experience over time, such that even arrays of tens of thousands of actuators cold be controlled.

Other advantages will appear hereinafter.

SUMMARY OF THE INVENTION

It has now been discovered that the above and other objects of the present invention may be accomplished in the following manner. Specifically, the present invention provides for at least one high voltage generator for a set or array of n electrostatic actuators, where n is an integer of significant size, such as at least 32 or 100 or 1,000 or even 10,000. Each of the n electrostatic actuators may optionally include a capacitor connected in parallel to maintain the actuator voltage. Each part of the array is to be initially charged to a desired operating voltage and then periodically recharged to that desired voltage to replace voltage losses due to leakage in the actuator. A low leakage capacitor can help the actuator keeping the ripple of the voltage between two refreshed cycles under the desired value.

Through experimentation or calculation, the specific voltage leakage for each element in an array is determined. The high voltage generator is connected to the parallel connection of the capacitor and the electrostatic actuator through a switch. The switch is controlled by a central processing unit, which can be any computer programmed to issue commands. Other than during the initial charging step, the switch operates during the time when the known leakage voltage is to be added to the line. The state of each switch is controlled by the information of the latch register. The load of the latch register occurs after the information is serially loaded into the shift register. Other than during the initial charging step, the switch operates during the time when the drop voltage generated by the leakage current is compensated in the refresh cycle.

The high voltage generator provides a voltage source that is determined by the needs of the device employing the array. The shape of the voltage and the time of the voltage rise is defined by the end use and the application of the array. The central processing unit is programmed to set the amount and form of the voltage, as well as to control the time for the switch to be open and closed.

When the design employs a relatively large number of actuators, such as in the thousands, one may decide to use more than one high voltage generator, each for n/2 or n/3 actuators for example. The advantage is that the charging time of the actuators will be twice or three times as fast and the disadvantage is the higher consumption of power and the bigger size of the circuit. This will reduce the total actuation time. The extreme of this concept is to have n high voltage generators, which may work for small numbers but would be impossible for thousands or even hundreds of actuators.

When the design employs a relatively large number of actuators, such as in the thousands, one may decide to use more than one Serial Data line generated by the CPU, each for n/2 or n/3 cells of the Shift Register. This means the Shift Register is split in two or three smaller shift registers that are simultaneously serial loaded. The advantage is that the loading time of the data in the shift register will be twice or three times as fast and the disadvantage is the higher power consumption and size of the circuit. This will reduce the total actuation time. At the limit the initial register can be split in n registers that it means the information will be parallel loaded instead of serial which may work for small numbers but would be impossible for thousands or even hundreds of actuators.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
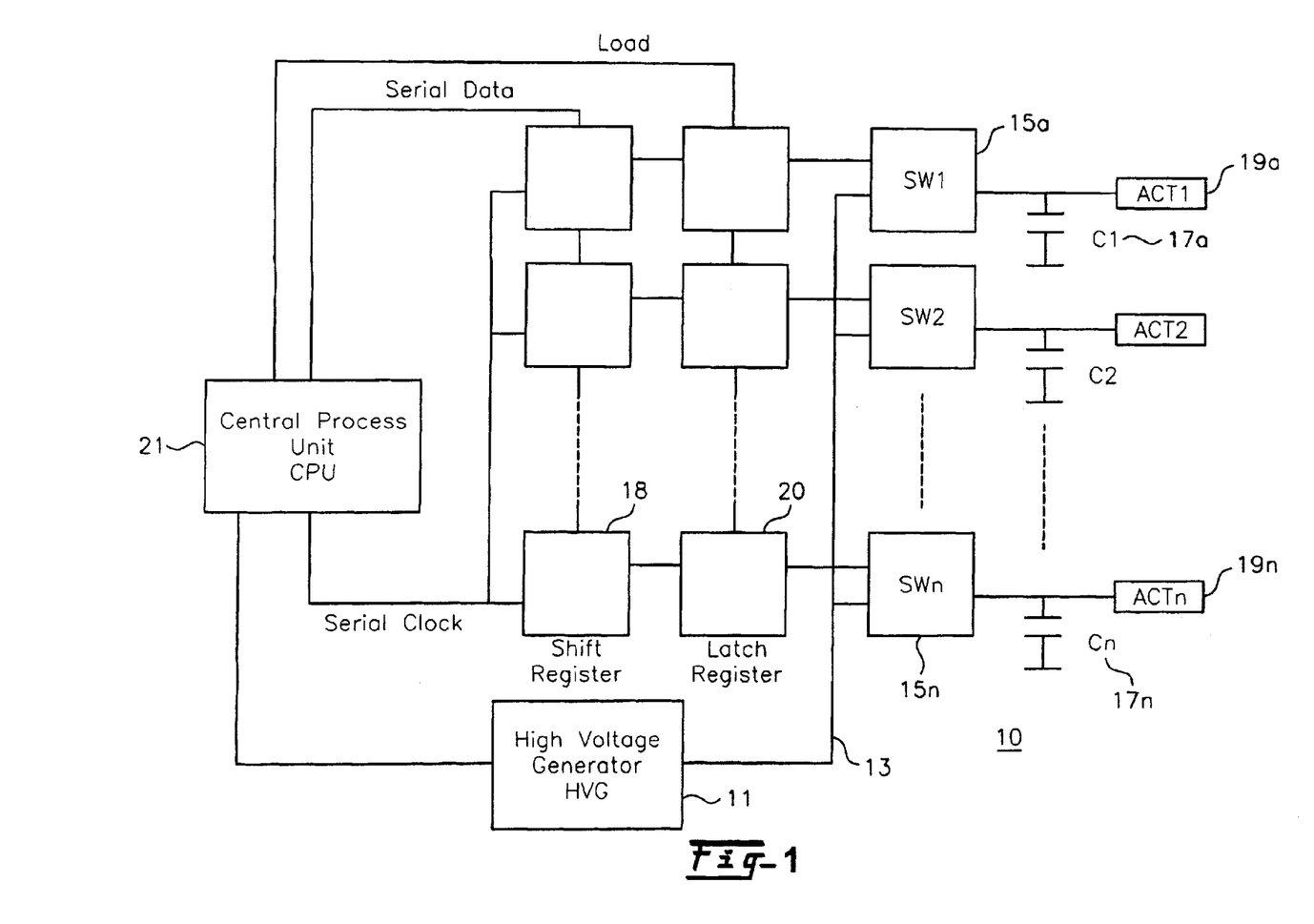
FIG. 1 is a schematic diagram showing the present invention in an array of electrostatic actuators having "n" actuators, "n" capacitors, "n" switches, a latch register with "n" cells, a shift register with "n" cells, the High Voltage Generator (HVG) and the Central Process Unit (CPU)

The circuit and method of the present invention is shown generally 10 in FIG. 1, where a high voltage generator 11 provides a voltage output 13 which goes to a plurality of n switches 15. The actual number "n" may be any number as long as it is an integer. Preferred numbers range, without limitation, from 32 to more than 100. A value for n of 1,000 or 10,000 or more is contemplated by the present invention.

The Central Process Unit CPU 21 controls the value and the shape of the HVG 11 and the status of each of the n switches 15. The information regarding the state of the switches is serial loaded into Shift Register 18 and next latched into the Latch Register 20.

The n switches 15 transmit the voltage output 13 to n electrostatic actuators 19, each are or are not connected in parallel to a capacitor, so that their are n pairs of capacitors 17 and actuators 19 or only n actuators 19. When switches 15 are closed, voltage output 13 charges each actuator-capacitor pair 17–19 at the voltage needed for the allocated actuators 19, as is done in arrays of electrostatic actuators.

Capacitors and electrostatic actuators are capable of holding a voltage for some period of time but need to be refreshed at some regular frequency to compensate for the voltage drift produced by the leaks of the electrostatic actuators 19, the capacitors 17 and associated electronics, depending on the end use of the array.

It is contemplated that the present invention circuit and method will employ a central processing unit 21 which controls the high voltage generator 11 and each of the n switches 15. The voltage output 13 will thus initially charge capacitors 17, but then will only be applied in short intervals and at predetermined values to refresh the voltage to the needed level.

Different forms of outputs 13 are intended for use with the present invention. All n switches are simultaneously address when the information from Shift Register 18 is loaded into Latch Register 20. The time interval between two successive accesses is defined as the output sample time, or OST and respective output sample frequency or OSF.

Figure 2:
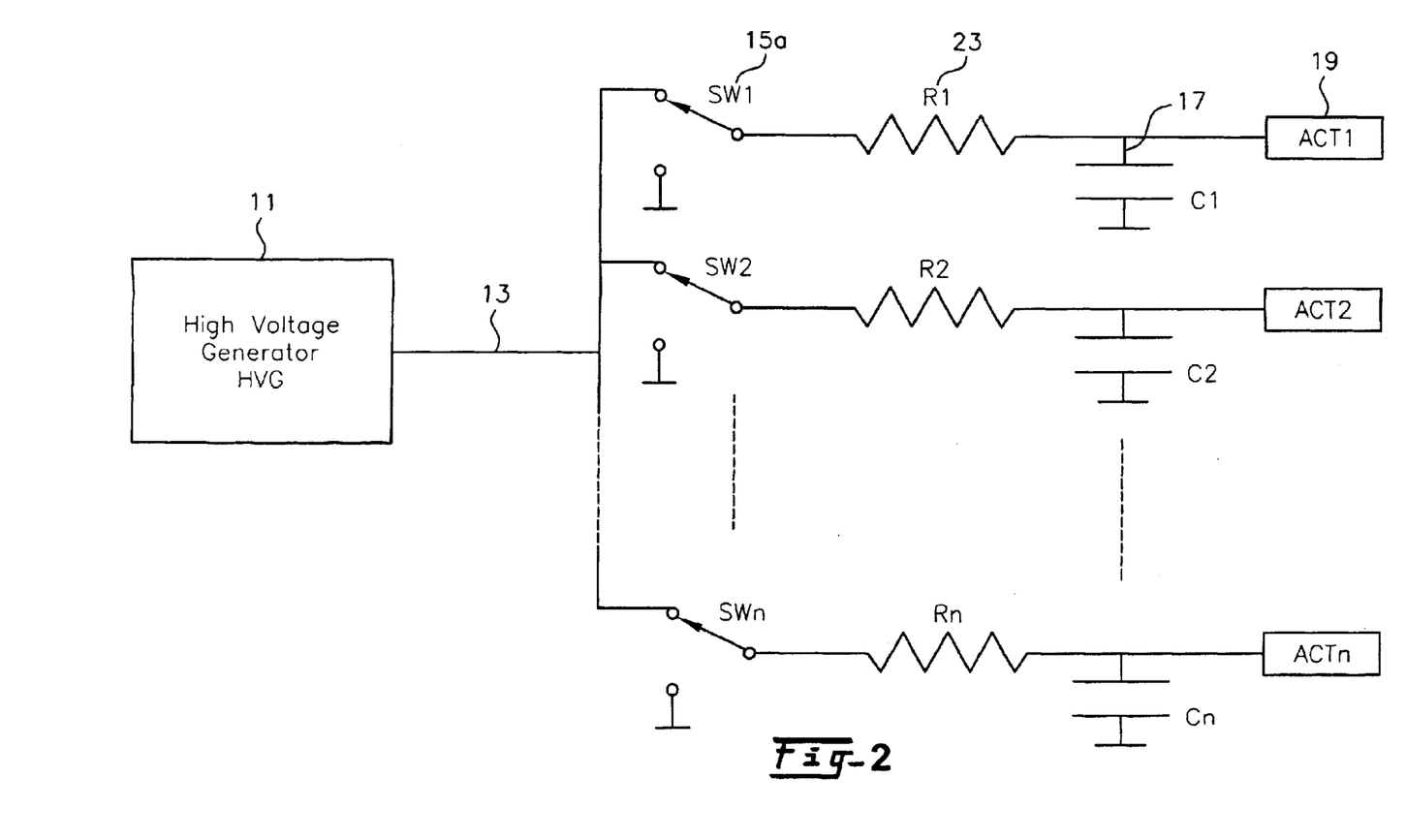
FIG. 2 is a schematic diagram illustrating a constant high voltage source for use as the high voltage generator of the present invention.

Shown in FIG. 2 is a constant high voltage $V_H$ in line 13, going to switch $15_i$, which in this case is a one pole, two throw switch 15a. Switch 15a, and all the n switches, realizes a pulse width modulation PWM moving from zero volts to VH. The switching frequency is constant with the value depending of the resolution of the output voltage needed by the application having a different duty cycle for each switch according with the output voltage needed for each line. If the application requests an 8 bit resolution, the voltages available will have the resolution VH/256 and the PWM frequency will be fPWM=OSF/256. For this type of high voltage driving, a resistor 23 is needed for each of the n electrostatic actuators 19, that with parallel capacitor 17 forms a low pass filter (LPF) that will extract the continue component of the pulse width modulation signal of each line. Depending on the duty cycle of each switch, the proper high voltage is generated for each actuator. The response time is determined by the LPF and is very much depending of the $f_{PWM}$ and the acceptable voltage ripple for the application. This circuit is fully digital.

Figure 3:
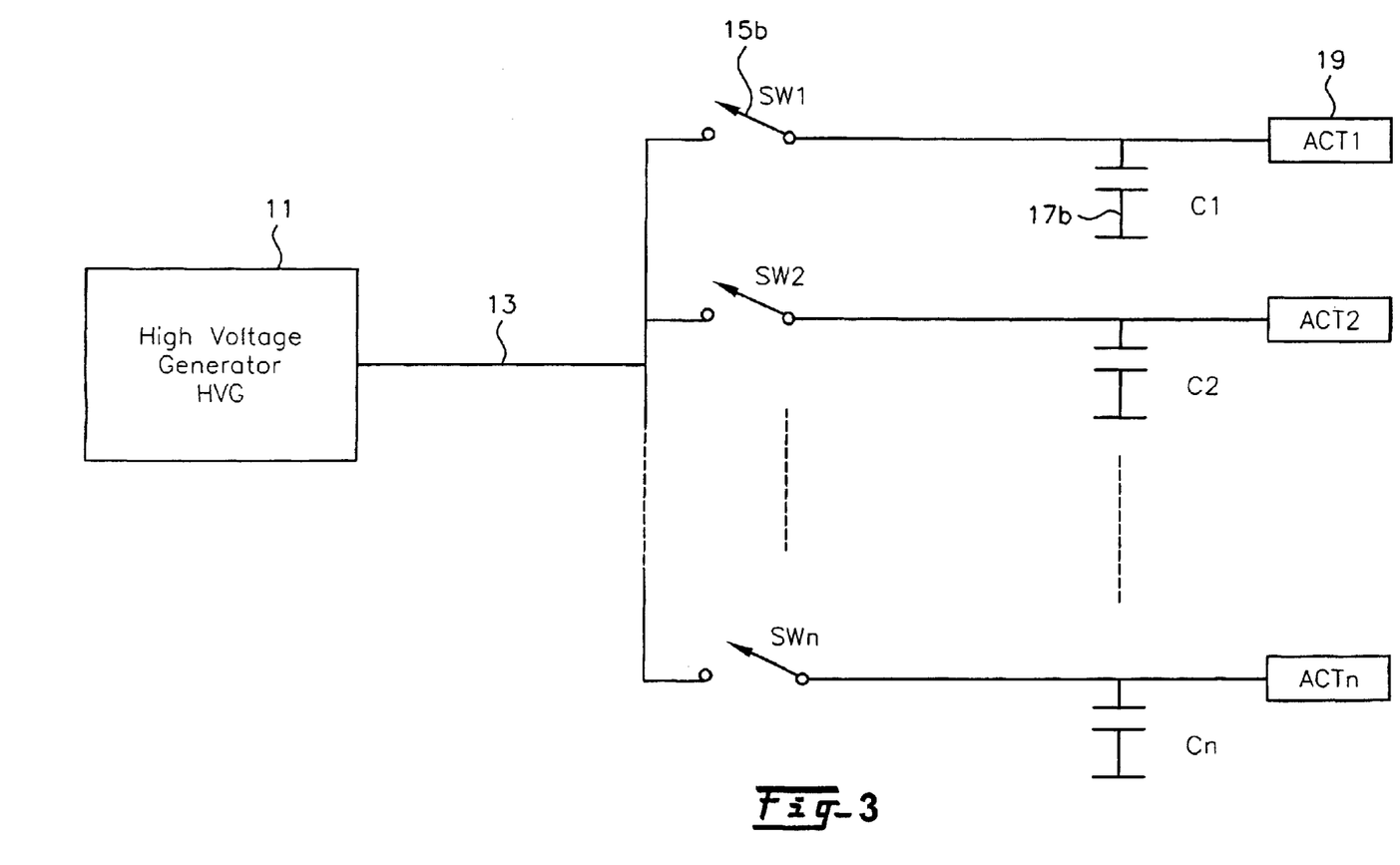
FIG. 3 is a schematic diagram illustrating the use of a variable source as the high voltage generator of the present invention.
Figure 5:
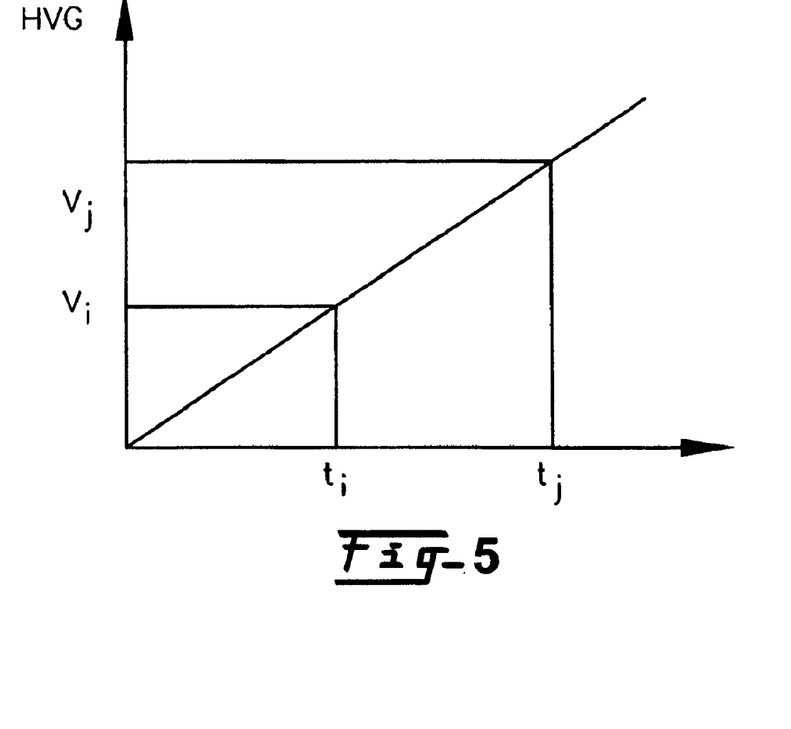
FIG. 5 is a graph illustrating a linear variable voltage for use as the high voltage generator for the embodiment of FIG. 3 and FIG. 4.

A one pole one throw switch 15b is used in FIG. 3 and the high voltage generator 11 is variable. In FIG. 5, is shown a single ramp voltage going from zero to the maximum desired voltage, VH. This voltage ramp is applied simultaneously to all n actuator-capacitor pairs through the n switches. Initially all the switches are closed and the capacitors start charging. For a given ramp, a certain time will represent a certain voltage level. After the time $t_i$ the level of voltage at the ramp will be Vi and at time tj the voltage level will be Vj as shown in FIG. 5. In order to get the voltage level Vj on capacitor 17b the switch 15b connecting the capacitor to the voltage ramp will be opened at time tj. A timing correction done by the RC constant of the circuit has to be introduced. By controlling the time to open the individual n switches, the level of voltage on each of n capacitors will be controlled. When all n switches are opened and all n capacitors are charged at the wanted voltage value, the voltage ramp can come back to zero volts. The current is maximum at the beginning of the ramp, when a large number of actuator-capacitor pairs are being charged, but the voltage is low. The current will decrease in time with successive opening of the n switches when a smaller number of actuator-capacitor pairs are to be charged but at a higher voltage. The ramp concept shown here minimizes the necessary power for a particular application. A new ramp can start and by controlling the time to close and to open the individual n switches will have a refresh cycle. If the leaking current of the actuator and opened switch is small we should not need the parallel capacitor if the ripple induced from one to next refresh cycle is acceptable for the application. The capacitor will reduce the ripple of the voltage for a particular application but will increase the necessary power.

Charging algorithms are set for each new set of high voltage outputs, or for long refresh time of a fixed set of output voltages. An algorithm to change the value of the driving voltages with a new set can be: first, the complete discharge of all capacitors by closing the switches and coming down with the HVG output at 0V and next the process can restart a new ramp. This algorithm will request higher power because the complete discharge of the capacitors before charging the voltage configuration of the actuators and can or cannot be accepted by the application.

Another algorithm to change the value of the driving voltages with a new set can be: first, starting the ramp with all the switches opened and next closing switches 15b for lines we need the same new voltage value 13 before the ramp reaches the desired voltage. That has to allow enough time for the old voltage value of the capacitor to increase or decrease to the ramp value and next the switch 15b is opened at the right time to leave capacitor 17b charged at the desired or needed voltage. This permits fast passing switching from one set of high voltage outputs to another saving some power.

Figure 4:
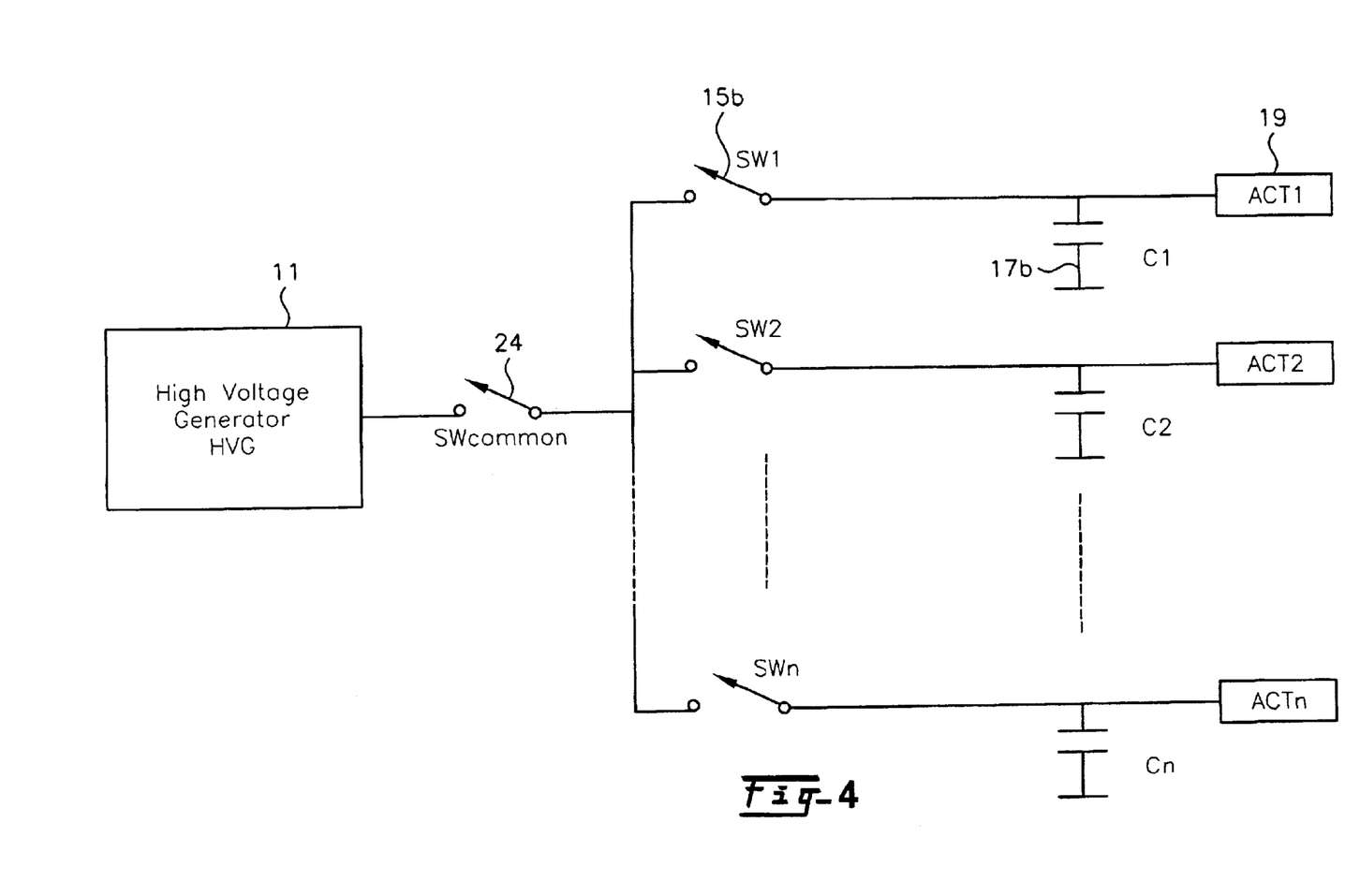
FIG. 4 is a schematic diagram illustrating the use of a variable source with output switch as the high voltage generator of the present invention.

Another algorithm to change the value of the driving voltages with a new set, that will save maximum power for an application is related with FIG. 4. The HVG output is connected with the common end of the switches with an other switch 24. For changing the voltages set of the actuators having all switches opened the common switch 24 is open and a new ramp starts. Now the switches we need to have the same next voltage value are closed. The charge will be redistributed between corresponding capacitors and all will have the same common voltage value. If this voltage value is smaller than the next needed voltage value, when the ramp will have a higher value than the common value, the common switch will be closed. The set of capacitors will be charged by the ramp and the switches will be opened at the right moment to leave the actuators at the voltage value we need. In this way we will save power using the charge from the previous actuation. If the common voltage value is higher than the next needed voltage value, before the ramp will reach the needed voltage value, the common switch will be closed. The set of capacitors will be discharged by the ramp and the switches will be opened at the right moment to leave the actuators at the voltage value we need. In this way we will save power minimizing the charge lost from the previous actuation. Next the common switch is open and the cycle is restarted with the next group of capacitors that have to have the next voltage value of the new voltage set.

It should be noted that the low limit for the output sample time will permit the finest resolution available for the output as represented by the equation: $\Delta V = m * OST_{min}$ when m is the ratio of the voltage ramp. For the constant slope ramp approach, the total actuation time is done mainly by the ratio m and the maximum output voltage need, $V_H$. Thus: $T_{act} = mV_H$.

Figure 6:
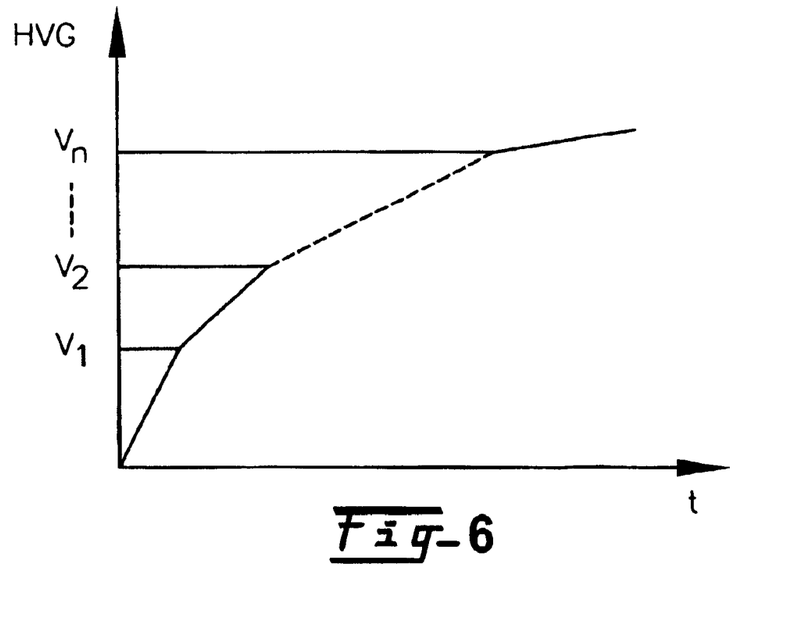
FIG. 6 is a graph illustrating a variable voltage with multiple successive decreasing slope ramps for use as the high voltage generator for the embodiment of FIG. 3 and FIG. 4.

With the high voltage shown in FIG. 6, the same one pole one throw switch 15b of FIG. 3 and FIG. 4 is used, with the same charging algorithms, but the shape of the voltage output generated by the high voltage generator 11 is a multiple successive slopes ramp. The nonlinearlity of the electrostatic force makes the displacement of electrostatic actuators less dependent on voltage at lower voltages and highly dependent on voltage at higher voltage levels, closer with the "pull-in" voltage where any variation in the driving voltage can be important. With the multiple successive slope ramps as HVG, the output resolution "$\Delta V$" above can be modified for the different voltage ranges of the successive slope values, using the same constant output sample time OST.

Figure 7:
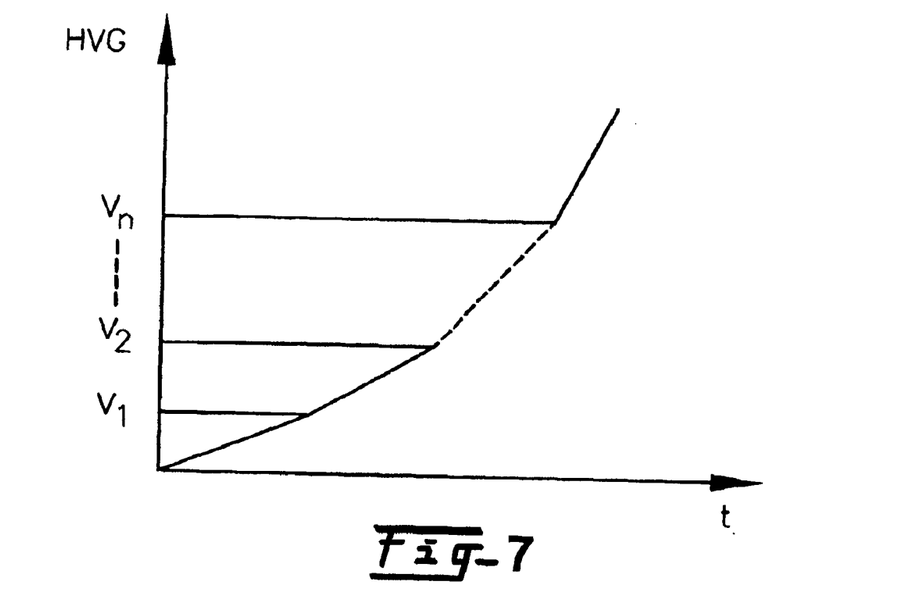
FIG. 7 is a graph illustrating a variable voltage with multiple successive increasing slope ramps for use as the high voltage generator for the embodiment of FIG. 3 and FIG. 4.

If the maximum current is a limiting factor, it can be limited for a particular application. For the low voltage ranges, when the majority of the n switches are closed and the total capacitance that has to be charged has a large value, a lower slope is used, requiring lower current but over a longer time interval, as in FIG. 7. For the high voltage range when the majority of n switches are opened and the total capacitance that has to be charged has a low value, the higher slope can be used, still keeping the current under a maximum limit but in a shorter time interval. This permits the reduction in power peaks. At the limit of this version, a constant current source is used as HVG. The actuation time can be optimized for each application using different slopes on different output voltage ranges according to the desired resolution and maximum current.

Figure 8:
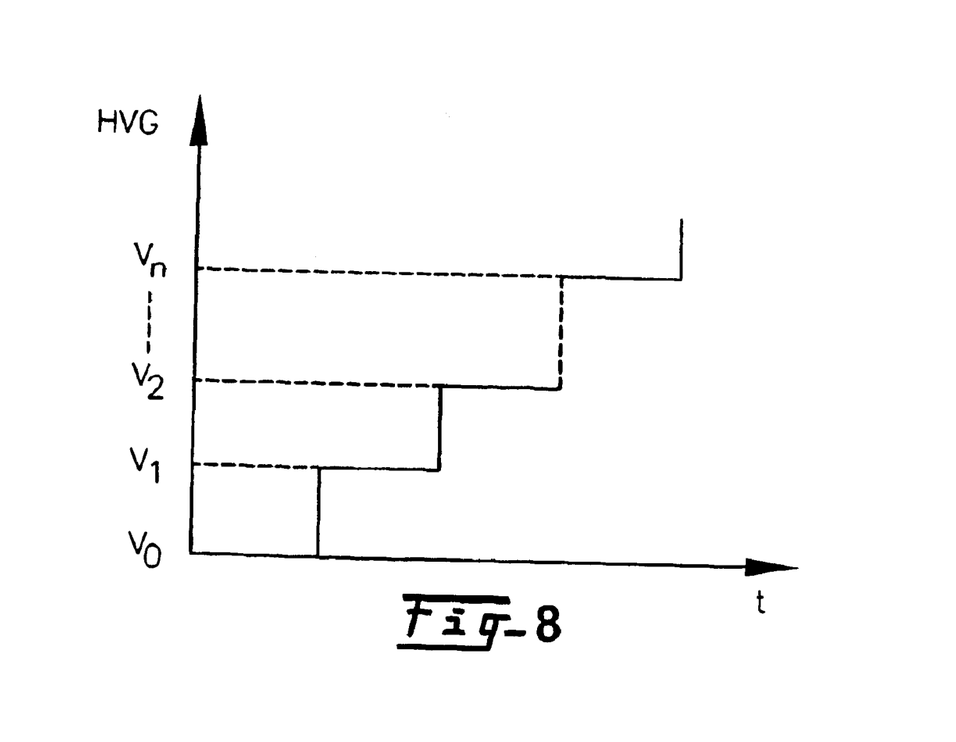
FIG. 8 is a schematic diagram illustrating a variable staircase voltage for use as the high voltage generator for the embodiment of FIG. 3 and FIG. 4.

Finally, in FIG. 8, a staircase high voltage output is shown, again for a one pole one throw switch 15b of FIG. 3 or FIG. 4. In a typical charge cycle, after each step-up of the high voltage staircase a waiting time is necessary for charging the n capacitors. The specific switches allocated to the capacitors we need to be charged at the actual step voltage are then opened. The next step-up follows and the process continues.

For the refresh of a voltage set and for a new voltage set, a specific staircase voltage is generated as in FIG. 8. For each step a predetermined set of switches are closed. After a necessary waiting time, the switches are opened, leaving the corresponding capacitor charged with the wanted voltage.

The power is higher than the ramp voltage approach, the difference depending by the number of steps. For each step, however, for short time, a higher current can be used than in other cases. The time of actuation for staircase approach is less than for the other approaches shown here, having the amount of time affected mainly by the time constant of the circuit (RC) at each step. The common switch technique (FIG. 4) can be as well used for stairs, saving power.

While particular embodiments of the present invention have been illustrated and described, it is not intended to limit the invention, except as defined by the following claims.

What is claimed is:

1. A circuit for controlling an array of n electrostatic actuators, where n is an integer, comprising:

at least one high voltage generator for providing a desired voltage;

n switches operably connected to said generator, each switch being directly connected to one of said n electrostatic actuators;

n capacitors, one of which is connected in parallel to each of said n actuators for receiving voltage from said high voltage generator through said switch; and a central processor for controlling said desired voltage, said processor further controlling the time each of said n switches is closed to apply said voltage to said capacitors and electrostatic actuators to establish and/or restore said desired voltage therein, wherein said central processor calculates the voltage leakage for each of said n electrostatic actuators and capacitors to thereby determine the time said switch is closed.

2. The circuit of claim 1, wherein the output of said high voltage generator is a constant high voltage.

3. The circuit of claim 1, wherein the output of said high voltage generator is a constant slope, ramp high voltage.

4. The circuit of claim 1, wherein the output of said high voltage generator is a multiple successive slope, ramp high voltage.

5. The circuit of claim 4, wherein said multiple successive, ramp high voltage contains different slopes to minimize the time of actuation of said n switches.

6. The circuit of claim 1, wherein the output of said high voltage generator is a staircase high voltage.

7. The circuit of claim 1, wherein the output of said high voltage generator has an output switch for minimizing the power.

8. The circuit of claim 1, wherein n is at least 1,000.

9. The circuit of claim 1, wherein n is between 1,000 and 10,000.

10. A circuit for controlling an array of n electrostatic actuators, where n is an integer, comprising:
   at least one high voltage generator means for providing a desired voltage;
   n switch means for transmitting said desired voltage and operably connected to said generator. each switch means being directly connected to one of said n electrostatic actuators;
   n capacitor means for storing said voltage, one of which is connected in parallel to each of said n actuators for receiving voltage from said high voltage generator means through said switch means; and
   central processor means for controlling said desired voltage, said processor means further controlling the time each of said n switch means is closed to apply said voltage to said capacitor means and electrostatic actuators to restore said desired voltage therein, wherein said central processor means calculates the voltage leakage for each of said n electrostatic actuators and capacitor means to thereby determine the time said switch means is closed.

11. The circuit of claim 10, wherein the output of said high voltage generator means is a constant high voltage.

12. The circuit of claim 10, wherein the output of said high voltage generator means is a constant slope, ramp high voltage.

13. The circuit of claim 10, wherein the output of said high voltage generator means is a multiple successive slope, ramp high voltage.

14. The circuit of claim 13, wherein said multiple successive, ramp high voltage contains different slopes to minimize the time of actuation of said n switch means.

15. The circuit of claim 10, wherein the output of said high voltage generator means is a staircase high voltage.

16. The circuit of claim 10, wherein n is at least 1,000.

17. The circuit of claim 10, wherein n is between 1,000 and 10,000.

18. A method for controlling an array of n electrostatic actuators, where n is an integer of, comprising the steps of:
   providing a desired voltage output from at least one high voltage generator;
   connecting n switches to said voltage output and connecting each switch to one of said n electrostatic actuators;
   connecting n capacitors in parallel to corresponding n actuators for receiving voltage from said high voltage generator through said switch such that each capacitor and its corresponding actuator is charged when said switch is closed to apply said voltage output; and
   controlling said desired voltage with a central processor, said processor further controlling the time each of said n switches is closed to apply said voltage to said capacitors and electrostatic actuators to restore said desired voltage therein, wherein said central processor calculates the voltage leakage for each of said n electrostatic actuators and capacitors to thereby determine the time said switch is closed.

19. The method of claim 18, wherein the output generated by said high voltage generator is a constant high voltage.

20. The method of claim 18, wherein the output generated by said high voltage generator is a constant slope, ramp high voltage.

21. The method of claim 18, wherein the output generated by said high voltage generator is a multiple successive slope, ramp high voltage.

22. The method of claim 21, wherein said multiple successive, ramp high voltage contains different slopes to minimize the time of actuation of said n switches.

23. The method of claim 18, wherein the output generated by said high voltage generator is a staircase high voltage.

24. The method of claim 18, wherein n is at least 1,000.

25. The method of claim 18, wherein n is between 1,000 and 10,000.

* * * * *